United States Patent [19]

Schumann

[11] Patent Number: 5,147,621

[45] Date of Patent: Sep. 15, 1992

[54] METHOD FOR STABILIZING PHOSPHORUS TRICHLORIDE

[75] Inventor: Rudolf Schumann, Raguhn, Fed. Rep. of Germany

[73] Assignee: Chemie AG Bitterfeld-Wolfen, Bitterfeld, Fed. Rep. of Germany

[21] Appl. No.: 665,512

[22] Filed: Mar. 6, 1991

[51] Int. Cl.$^5$ .............................................. C01B 11/02
[52] U.S. Cl. .................................. 423/265; 423/300
[58] Field of Search .................. 423/300, 301, 265; 252/182.32, 399

[56] References Cited

U.S. PATENT DOCUMENTS 3,903,002  9/1975  Hotten ................................ 252/46.7
4,197,209  4/1980  Zinke et al. ....................... 252/46.6
4,846,985  7/1989  Rizvi et al. ........................ 252/48.2

Primary Examiner—Michael Lewis
Assistant Examiner—Valerie Lund
Attorney, Agent, or Firm—Jordan and Hamburg

[57] ABSTRACT

The invention relates to a method for stabilizing phosphorus trichloride. In order to delay the formation of phosphorus oxychloride in phosphorus trichloride and to reduce it to a minimum value which no longer adversely affects further processing, one or more amines which have at least two aromatic hydrocarbon groups linked to one nitrogen atom, such as diphenylamine, phenothiazine, phenyl-4-methylphenylamine and triphenylamine, are added to the phosphorus trichloride. The amines can also be added in the form of their salts, including their quaternary ammonium compounds, or their reaction products with phosphorus halides. The amounts of amines, added fall within the range of $10^{-6}\%$ to $10^{-1}\%$, based on the amount of phosphorus trichloride.

20 Claims, No Drawings

METHOD FOR STABILIZING PHOSPHORUS TRICHLORIDE

BACKGROUND OF THE INVENTION

The present invention relates to a method for stabilizing phosphorus trichloride.

Phosphorous trichloride is prepared industrially by the reaction of phosphorus with chlorine. It generally contains less than 0.05% phosphorus oxychloride if it is prepared from purified chlorine, or if it is rectified when chlorine is used which has not been purified.

However, phosphorus trichloride can easily be oxidized by oxygen or oxygen-containing gases to phosphorus oxychloride. A slow, steady increase in the phosphorus oxychloride content can be observed during storage, transport and use of phosphorus trichloride. The phosphorus oxychloride lowers the quality of the phosphorus trichloride and necessarily leads to undesirable by-products during chemical processing, so that the desired end product is of lower quality and is obtained in a lesser yield. For example, in further processing to phosphorus pentachloride or phosphorus sulfochloride, all the phosphorus oxychloride reaches the end product. Because of the physical properties, subsequent separation is much more difficult than separation from phosphorus trichloride. During further processing to phosphorous acid, phosphoric acid is formed from the phosphorus oxychloride and phosphates are formed as by-products during the reaction with alcohols to phosphites. During the synthesis of tri-(2-chloroethyl) phosphite by reaction with ethylene oxide, tri-(2-chloroethyl) phosphate is formed as an interfering by-product.

During the synthesis, storage and transport of phosphorus trichloride, care must therefore be taken to exclude air or other oxygen-containing gases as far as possible. The storage of phosphorus trichloride under a slight excess pressure of a dry, oxygen-deficient inert gas is known (Chem. Techn. 33 (1981), vol. 4, page 191). In practice, the synthesis and transport of phosphorus trichloride are also carried out while largely excluding oxygen, if necessary, under the protection of an inert gas, such as nitrogen or carbon dioxide. Nevertheless, during prolonged transport and storage, oxygen has a pronounced effect and there is formation of phosphorus oxychloride. For example, when shipping tank car lots, concentrations of mainly 0.2% to 0.8% phosphorus oxychloride occur.

Because of the high cost of energy and equipment, subsequent or repeated purification by distillation cannot be given consideration.

Decreasing the amount of and stabilizing the phosphorus oxychloride by adsorbents, such as silica gel (Gallus-Olender, I. and Franc, B.; Z. anorgan. allg. Chem. 451 (1979), pages 189-192 and PL Patent 85 068) are also very disadvantageous because of the large expenditure for equipment, the costs of the adsorbent, the product losses and the disposal of waste. For example, to lower the $POCl_3$ content from 0.78% to 0.07%, calculated as $H_3PO_4$, and to stabilize the phosphorus trichloride, a contact time of 21 days and 10% silica gel, based on the amount of phosphorus trichloride, are required.

SUMMARY OF THE INVENTION

It is an object of the present invention to decrease the technical and economic expense of stabilizing phosphorus trichloride and to reduce the quality losses of the phosphorus trichloride during storage and transport.

The task of the invention consists of providing a method for the stabilization of phosphorus trichloride, during which the formation of phosphorus oxychloride in the phosphorus trichloride is delayed significantly and reduced to a minimum value, which no longer adversely affects further processing.

Pursuant to the invention, this objective is accomplished owing to the fact that one or more amines, which have at least two aromatic hydrocarbon groups linked to one nitrogen atom, are added to the phosphorus trichloride.

DESCRIPTION OF THE PREFERRED EMBODIMENTS

The following compounds, for example, are used as amines:

diphenylamine
phenyl-4-methylphenylamine
bis-(4-methylphenyl)-amine
2,6-dichloro-diphenylamine
2-chloro-2',4-dinitrodiphenylamine
N-isopropyl-N'-phenyl-4-phenylenediamine
N,N'-diphenyl-4-phenylenediamine
phenothiazine
phenyl-2-naphthylamine
diphenyl-methylamine
diphenyl-cyclohexylamine
triphenylamine The amines can also be added in the form of their salts, including their quaternary ammonium compounds or their reaction products with phosphorus halides. Such compounds, are, for example:

diphenylamine hydrochloride
diphenylamine hydrobromide
diphenylamine hydronitrate
triphenylamine hydrochloride
dimethyl-diphenyl-ammonium iodide
dimethyl-diphenyl-ammonium-methyl sulfate
diphenylamino-dibromophosphan
diphenylamino-dichlorophosphan
bis-(diphenylamino)-chlorophosphan The amines can be added in dissolved or dispersed form. Chloroform or methylene chloride, for example, are used as solvent. The amines are added in an amount of $10^{-6}\%$ to $10^{-1}\%$, based on the amount of phosphorus trichloride. It is also possible to add the amines to only a portion of the phosphorus trichloride and to mix this portion subsequently with the remaining amount of phosphorus trichloride.

The amount of stabilizer depends on the intended effect, such as the degree and duration of the stabilization, as well on the amine selected.

The stabilizer can also be formed or converted in situ. For example, amines can be formed in the phosphorus trichloride from aminochlorophosphans and amine hydrochlorides. The amines, which have at least two aromatic hydrocarbon groups linked to one nitrogen atom, stabilize the phosphorus trichloride outstandingly against the effects of oxygen or oxygen-containing gases. The formation of phosphorus oxychloride in the phosphorus trichloride is delayed to such an extent and reduced quantitatively to such a degree, that the phosphorus trichloride retains almost its original quality even after having been stored or transported for several weeks. Further chemical processing of the phosphorus trichloride can therefore be carried out without problems and does not lead to any losses in yield or reductions in quality of the end products that are to be produced.

The invention will be described below by means of two examples.

EXAMPLE 1

In each case, 50 ml of phosphorus trichloride, freshly prepared under industrial conditions, was filled into 500 ml glass flasks under dry, oxygen-deficient argon, treated with one or several amines which have at least two aromatic hydrocarbon groups linked to one nitrogen atom, and mixed well. The argon was subsequently replaced by ambient room air and the sample was stored at room temperature. Immediately before the admission of air and 30 days later, samples were taken and analyzed by infrared spectrophotometry for their phosphorus oxychloride content. In each case, three parallel oxidation experiments were set up and the average values were determined.

For comparison, three samples were prepared in the manner described above from each batch of phosphorus trichloride starting material without addition of an amine and the formation of phosphorus oxychloride was investigated. The results are given in the following Table 1.

TABLE 1

| Additive | Amount (mg) | % by Weight of Phosphorus* | | |
|---|---|---|---|---|
| | | 1 | 2 | 3 |
| Diphenylamine | 1 | 0.03 | 1.6 | 0.05 |
| Phenyl-4-methylphenylamine | 1 | 0.03 | 1.6 | 0.14 |
| Bis-(4-methylphenyl)-amine | 1 | 0.03 | 1.6 | 0.13 |
| 2,6-Dichloro-diphenylamine | 1 | 0.03 | 1.6 | 0.05 |
| 2-Chloro-2',4-dinitrodiphenylamine | 10 | 0.03 | 1.2 | 0.11 |
| N-Isopropyl-N'-phenyl-4-phenylenediamine | 1 | 0.03 | 1.6 | 0.05 |
| Phenothiazine | 1 | 0.03 | 1.6 | 0.04 |
| Phenyl-2-naphthylamine | 10 | 0.03 | 1.6 | 0.04 |
| Phenyl-2-naphthylamine | 1 | 0.03 | 1.6 | 0.16 |
| Diphenyl-methylamine | 1 | 0.02 | 1.6 | 0.04 |
| Diphenyl-cyclohexylamine | 1 | 0.03 | 1.6 | 0.11 |
| Triphenylamine | 1 | 0.02 | 1.4 | 0.07 |
| Diphenylamine hydrochloride | 1 | 0.02 | 1.6 | 0.03 |
| Diphenylamine hydrobromide | 1 | 0.03 | 1.6 | 0.05 |
| Diphenylamine hydronitrate | 1 | 0.02 | 1.5 | 0.04 |
| Triphenylamine hydrochloride | 1 | 0.02 | 1.6 | 0.09 |
| Dimethyl-diphenyl-ammonium iodide | 1 | 0.02 | 1.6 | 0.04 |
| Dimethyl-diphenyl-ammonium methyl sulfate | 1 | 0.02 | 1.6 | 0.05 |
| Diphenylamino-dibromophosphan | 1 | 0.03 | 1.6 | 0.07 |
| Diphenylamino-dichlorophosphan | 1 | 0.03 | 1.6 | 0.06 |
| Bis-(diphenylamino)-chlorophosphan | 1 | 0.03 | 1.6 | 0.06 |
| Diphenylamine with triphenylamine each | 0.5 | 0.02 | 1.5 | 0.04 |
| Phenothiazine with dimethyl-diphenyl-ammonium iodide each | 0.5 | 0.02 | 1.5 | 0.04 |
| Diphenylamine | 0.2[1)] | 0.02 | 1.4 | 0.05 |
| Diphenylamine | 0.02[2)] | 0.02 | 1.4 | 0.09 |
| Diphenylamine | 0.002[2)] | 0.02 | 1.0[4)] | 0.60[4)] |
| Diphenylamine | 0.2[3)] | 0.02 | 1.4 | 0.06 |

TABLE 1-continued

| Additive | Amount (mg) | % by Weight of Phosphorus* | | |
|---|---|---|---|---|
| | | 1 | 2 | 3 |
| Triphenylamine | 0.2[1)] | 0.03 | 1.8 | 0.10 |

Key to Table
*1 before the action of oxygen
2 after the action of oxygen without additive
3 after the action of oxygen with additive
[1)]dissolved in chloroform; concentration: 10 mg/ml
[2)]dissolved in chloroform; concentration: 0.1 mg/ml
[3)]dissolved in methylene chloride; concentration: 10 mg/ml
[4)]after 1 day

EXAMPLE 2

To a gas wash bottle, equipped with reflux condenser and a glass frit for dispersing gas, 100 mL of phosphorus trichloride with a phosphorus oxychloride content of 0.03% were added, mixed with the amine and treated uniformly for one hour with 10 L of oxygen. Subsequently, the phosphorus oxychloride content was checked by infrared spectrophotometry. The results obtained are compared with a sample without additive in the following Table 2.

TABLE 2

| Additive | Amount (mg) | % by Weight of Phosphorus Oxychloride |
|---|---|---|
| Diphenylamine | 5 | 0.88 |
| Diphenylamine | 50 | 0.18 |
| N,N'-diphenyl-4-phenylenediamine | 5[5)] | 1.45 |
| N,N'-Diphenyl-4-phenylenediamine | 50[5)] | 0.78 |
| None | — | 20.40 |

[5)]added as a dispersion in chloroform; concentration: 20 mg/mL

I claim:

1. A method for stabilizing phosphorus trichloride, comprising adding to a composition consisting essentially of phosphorus trichloride a stabilizing agent selected from the group consisting of amines having at least two hydrocarbons linked to one nitrogen atom, salts of said amines, reaction products of said amines with phosphorus halides, and mixtures thereof.

2. The method of claim 1, further comprising adding said stabilizing agent in dissolved form.

3. The method of claim 1, further comprising adding said stabilizing agent in dispersed form.

4. The method of claim 1, wherein said stabilizing agent is added in an amount of $10^{-6}\%$ to $10^{-1}\%$ by weight, based on the amount of phosphorus trichloride.

5. The method of claim 1, wherein said stabilizing agent is selected from the group consisting of diphenylamine, phenyl-4-methylphenylamine, bis-(4-methylphenyl)-amine, 2,6-dichlorodiphenylamine, 2-chloro-2',4-dinitrodiphenylamine, N-isopropyl-N'-phenyl-4-phenylenediamine, N,N'-diphenyl-4-phenylenediamine, phenothiazine, phenyl-2-naphthylamine, diphenylmethylamine, diphenyl-cyclohexylamine, triphenylamine and mixtures thereof.

6. The method of claim 1, wherein said stabilizing agent is selected from the group consisting of diphenylamine hydrochloride, diphenylamine hydrobromide, diphenylamine hydronitrate, triphenylamine hydrochloride, dimethyl-diphenyl-ammonium iodide, dimethyl-diphenyl-ammonium-methyl sulfate, diphenylaminodibromophosphan, diphenylaminodichlorophosphan, bis-(diphenylamino)-chlorophosphan and mixtures thereof.

7. A method for stabilizing phosphorus trichloride, comprising adding to a first portion consisting essentially of phosphorus trichloride a stabilizing agent selected from the group consisting of amines having at least two hydrocarbons linked to one nitrogen atom, salts of said amines, reaction products of said amines with phosphorus halides, and mixtures thereof; and subsequently adding thereto a second portion of phosphorus trichloride.

8. The method of claim 7, further comprising adding said stabilizing agent in dissolved form.

9. The method of claim 7, further comprising adding said stabilizing agent in dispersed form.

10. The method of claim 7, wherein said stabilizing agent is added in an amount of $10^{-6}\%$ to $10^{-1}\%$ by weight, based on the amount of phosphorus trichloride.

11. The method of claim 7, wherein said stabilizing agent is selected from the group consisting of diphenylamine, phenyl-4-methylphenylamine, bis-(4-methylphenyl)-amine, 2,6-dichlorodiphenylamine, 2-chloro-2',4-dinitrodiphenylamine, N-isopropyl-N'-phenyl-4-phenylenediamine, N,N'-diphenyl-4-phenylenediamine, phenothiazine, phenyl-2-naphthylamine, diphenylmethylamine, diphenyl-cyclohexylamine, triphenylamine and mixtures thereof.

12. The method of claim 7, wherein said stabilizing agent is selected from the group consisting of diphenylamine hydrochloride, diphenylamine hydrobromide, diphenylamine hydronitrate, triphenylamine hydrochloride, dimethyl-diphenyl-ammonium iodide, dimethyl-diphenyl-ammonium-methyl sulfate, diphenylaminodibromophosphan, diphenylaminodichlorophosphan, bis-(diphenylamino)-chlorophosphan and mixtures thereof.

13. A composition consisting essentially of phosphorus trichloride and a stabilizing agent selected from the group consisting of amines having at least two hydrocarbons linked to one nitrogen atom, salts of said amines, reaction products of said amines with phosphorus halides, and mixtures thereof.

14. The composition of claim 13, wherein said stabilizing agent is dissolved in a solvent.

15. The composition of claim 14, wherein said solvent is selected from the group consisting of chloroform and methylene chloride.

16. The composition of claim 13, wherein said stabilizing agent is dispersed in a solvent.

17. The composition of claim 16, wherein said solvent is selected from the group consisting of chloroform and methylene chloride.

18. The composition of claim 13, wherein said stabilizing agent is selected from the group consisting of diphenylamine, phenyl-4-methylphenylamine, bis-(4-methylphenyl)-amine, 2,6-dichloro-diphenylamine, 2-chloro-2',4-dinitrodiphenylamine, N-isopropyl-N'-phenyl-4-phenylenediamine, N,N'-diphenyl-4-phenylenediamine, phenothiazine, phenyl-2-naphthylamine, diphenylmethylamine, diphenyl-cyclohexylamine, triphenylamine and mixtures thereof.

19. The composition of claim 13, wherein said stabilizing agent is selected from the group consisting of diphenylamine hydrochloride, diphenylamine hydrobromide, diphenylamine hydronitrate, triphenylamine hydrochloride, dimethyl-diphenylammonium iodide, dimethyl-diphenyl-ammonium-methyl sulfate, diphenylamino-dibromophosphan, diphenylamino-dichlorophosphan, bis-(diphenylamino)-chlorophosphan and mixtures thereof.

20. The composition of claim 13, wherein said stabilizing agent is present in an amount of $10^{-6}\%$ to $10^{-1}\%$ by weight, based on the amount of phosphorus trichloride.

* * * * *